US012616086B2

(12) United States Patent
Howard

(10) Patent No.: US 12,616,086 B2
(45) Date of Patent: May 5, 2026

(54) BRUSH ATTACHMENT SYSTEM FOR A TURFGRASS MOWER

(71) Applicant: Harold F. Howard, Phoenix, AZ (US)

(72) Inventor: Harold F. Howard, Phoenix, AZ (US)

( * ) Notice: Subject to any disclaimer, the term of this patent is extended or adjusted under 35 U.S.C. 154(b) by 433 days.

(21) Appl. No.: 18/446,399

(22) Filed: Aug. 8, 2023

(65) Prior Publication Data

US 2024/0049643 A1      Feb. 15, 2024

Related U.S. Application Data

(60) Provisional application No. 63/396,513, filed on Aug. 9, 2022.

(51) Int. Cl.
| | |
|---|---|
| *A01D 34/00* | (2006.01) |
| *A01B 45/00* | (2006.01) |
| *A01D 57/00* | (2006.01) |
| *A01D 101/00* | (2006.01) |

(52) U.S. Cl.
CPC ............ *A01D 34/001* (2013.01); *A01B 45/00* (2013.01); *A01D 57/00* (2013.01); *A01D 2101/00* (2013.01)

(58) Field of Classification Search
CPC .. A01D 34/001; A01D 57/00; A01D 2101/00; A01B 45/00
See application file for complete search history.

(56) References Cited

U.S. PATENT DOCUMENTS

| | | | |
|---|---|---|---|
| 1,757,844 A | 5/1930 | John | |
| 1,890,810 A | 12/1932 | Gast | |
| 2,021,821 A | * | 11/1935 | Wescott ................. A01D 57/01 56/3 |
| 2,143,402 A | | 1/1939 | Baker |
| 2,197,264 A | * | 4/1940 | Cooper ................. A01D 34/46 D15/16 |
| 2,962,854 A | | 12/1960 | Jepson |
| 2,984,961 A | | 5/1961 | Judkins |
| 3,525,201 A | * | 8/1970 | Kaufman ............... A01D 34/42 56/7 |

(Continued)

FOREIGN PATENT DOCUMENTS

WO        WO-0150837 A1 *  7/2001   ............. A01D 75/30

OTHER PUBLICATIONS

Ofice Action (Non-Final Rejection) dated Aug. 15, 2025 for U.S. Appl. No. 18/063,995 (pp. 1-9).

*Primary Examiner* — Arpad Fabian-Kovacs
(74) *Attorney, Agent, or Firm* — Pacer K. Udall; Booth Udall, PLC

(57) ABSTRACT

A brush attachment system for a turfgrass mower with a crossbeam, a brush mount, and left and right mounting brackets. The brush mount is suspended from the crossbeam and is configured to support a brush. The left and right mounting brackets are attached to the left and right ends of the crossbeam, respectively. Each of the mounting brackets may have a bracket plate and a clamp. The bracket plate has a clamping surface, and the clamp is configured to butt against the clamping surface of the bracket plate. Slots extend into the bracket plate and slots extend into the clamp. The slots align when the clamp butts against the clamping surface to form holes through the mounting brackets. The brush attachment system is configured to attach to the turfgrass mower by passing two crossbars of the turfgrass mower through the holes of the mounting brackets.

19 Claims, 11 Drawing Sheets

(56)  References Cited

U.S. PATENT DOCUMENTS

| | | | | |
|---|---|---|---|---|
| 4,899,828 | A * | 2/1990 | Harris | A01B 45/02 |
| | | | | 172/21 |
| 4,989,676 | A | 2/1991 | Rogers | |
| 5,477,927 | A * | 12/1995 | Figura | A01B 45/02 |
| | | | | 172/29 |
| 6,732,500 | B1 * | 5/2004 | Myers | A01D 34/54 |
| | | | | 56/17.2 |
| 7,065,947 | B1 | 6/2006 | Street | |
| 7,069,711 | B1 | 7/2006 | Connell | |
| 8,104,252 | B1 | 1/2012 | Godley, Jr. | |
| 8,220,240 | B2 | 7/2012 | Dirk | |
| 8,628,107 | B2 * | 1/2014 | Harper | B60D 1/345 |
| | | | | 280/515 |
| 9,730,381 | B2 | 8/2017 | Fichera | |
| 9,820,437 | B2 | 11/2017 | Hoppel | |
| 9,839,176 | B1 | 12/2017 | Snyder | |
| 10,368,483 | B1 | 8/2019 | Howard | |
| 10,375,886 | B2 | 8/2019 | Hine | |
| 11,252,862 | B1 | 2/2022 | Howard | |
| 11,472,242 | B1 * | 10/2022 | Draper | B60D 1/167 |
| 11,565,557 | B2 * | 1/2023 | McAllister | B60D 1/247 |
| 12,075,732 | B2 | 9/2024 | Danling | |
| 2003/0145570 | A1 * | 8/2003 | Berndt | A01D 34/003 |
| | | | | 56/6 |
| 2003/0230067 | A1 | 12/2003 | Weinlader | |
| 2008/0122198 | A1 * | 5/2008 | Anderson | B60D 1/34 |
| | | | | 280/455.1 |
| 2010/0154374 | A1 | 6/2010 | Hibino | |
| 2010/0326679 | A1 | 12/2010 | Tielbürger | |
| 2012/0096661 | A1 * | 4/2012 | Pizano | A46B 9/02 |
| | | | | 15/160 |
| 2013/0056956 | A1 * | 3/2013 | Mauerman | B60D 1/247 |
| | | | | 280/455.1 |
| 2014/0215989 | A1 * | 8/2014 | Pilon, Jr. | A01D 43/00 |
| | | | | 56/13.5 |
| 2015/0201554 | A1 | 7/2015 | Mccarthy | |
| 2015/0223396 | A1 | 8/2015 | Lingle | |
| 2023/0284544 | A1 | 9/2023 | Behling | |

* cited by examiner

110

110

BRUSH ATTACHMENT SYSTEM FOR A TURFGRASS MOWER

CROSS REFERENCE TO RELATED APPLICATIONS

This application claims the benefit of the filing date of U.S. Provisional Patent Application 63/396,513 entitled "Brush Attachment System for a Turfgrass Mower" to Harold F. Howard that was filed on Aug. 9, 2022, the disclosure of which is hereby incorporated herein by this reference.

TECHNICAL FIELD

Aspects of this document relate generally to turfgrass mowers, and more specifically to brush attachments for turfgrass mowers.

BACKGROUND

In caring for turfgrass, it is desirable to have each blade of grass be as close to the same length as possible, as this increases the aesthetic appeal of the grass and allows the grass to apply a consistent effect to any objects traveling over the grass, such as a golf ball. To this end, turfgrass may be brushed prior to cutting so that each blade will be as close to the same length as possible.

SUMMARY

One aspect of this document relates to a brush attachment system for a turfgrass mower that includes a crossbeam extending between a left end and a right end distal to the left end. A brush mount is suspended from the crossbeam and configured to support a brush. A left adjustment plate and a right adjustment plate are attached to the left end and the right end of the crossbeam, respectively, each of the left adjustment plate and the right adjustment plate having a plurality of height adjustment holes extending therethrough. A left mounting bracket and a right mounting bracket are attached to the left adjustment plate and the right adjustment plate, respectively, wherein the height adjustment holes of the left adjustment plate and the right adjustment plate enable adjustment of a position of the left mounting bracket and the right mounting bracket on the left adjustment plate and the right adjustment plate, respectively. Each of the left mounting bracket and the right mounting bracket have: a bracket plate having a plurality of planar surfaces including a first planar surface, a second planar surface, and a clamping surface extending between the first planar surface and the second planar surface; a clamp configured to butt against the clamping surface of the bracket plate; at least two semicircular slots extending into the bracket plate and at least two semicircular slots extending into the clamp, wherein when the clamp butts against the clamping surface, the at least two semicircular slots of the bracket plate align with the at least two semicircular slots of the clamp to form two circular holes; and a bolt hole extending through the bracket plate between the at least two semicircular slots of the bracket plate and through the clamp between the at least two semicircular slots of the clamp, the bolt hole configured to receive a bolt, wherein when the bolt extends through the bolt hole and a nut is tightened onto the bolt, the clamp is pressed against the clamping surface of the bracket plate. Each of the left mounting bracket and the right mounting bracket is configured to attach to a turfgrass mower having two crossbars by attaching the clamp to the bracket plate with the two crossbars of the turfgrass mower passing through the two circular holes.

Particular implementations may comprise one or more of the following features.

The left mounting bracket and the right mounting bracket are configured to be rotationally fixed in all directions with respect to the turfgrass mower when the left mounting bracket and the right mounting bracket are attached to the turfgrass mower.

The brush attachment system may further include a plurality of bolts configured to pass through the bracket plates of the left mounting bracket and the right mounting bracket to attach the left mounting bracket and the right mounting bracket to the left adjustment plate and the right adjustment plate, respectively.

The first planar surface and the second planar surface are parallel.

Another aspect of this document relates to a brush attachment system for a turfgrass mower that includes a crossbeam extending between a left end and a right end distal to the left end. A brush mount is suspended from the crossbeam and configured to support a brush. A left mounting bracket and a right mounting bracket are attached to the left end of the crossbeam and the right end of the crossbeam, respectively. Each of the left mounting bracket and the right mounting bracket have: a bracket plate having a clamping surface; a clamp configured to butt against the clamping surface of the bracket plate; at least two slots extending into the bracket plate and at least two slots extending into the clamp, wherein when the clamp butts against the clamping surface, the at least two slots of the bracket plate align with the at least two slots of the clamp to form two holes; and a bolt hole extending through the bracket plate and through the clamp, the bolt hole configured to receive a bolt, wherein when the bolt extends through the bolt hole and a nut is tightened onto the bolt, the clamp is pressed against the clamping surface of the bracket plate. Each of the left mounting bracket and the right mounting bracket is configured to attach to a turfgrass mower having two crossbars by attaching the clamp to the bracket plate with the two crossbars of the turfgrass mower passing through the two holes.

Particular implementations may comprise one or more of the following features.

The brush attachment system may further include a left adjustment plate and a right adjustment plate attached to the left end and the right end of the crossbeam, respectively, wherein the left mounting bracket is attached to the left end of the crossbeam through the left adjustment plate and the right mounting bracket is attached to the right end of the crossbeam through the right adjustment plate.

Each of the left adjustment plate and the right adjustment plate has a plurality of height adjustment holes extending therethrough, the plurality of height adjustment holes configured to enable adjustment of a position of the left mounting bracket and the right mounting bracket on the left adjustment plate and the right adjustment plate, respectively.

Each bracket plate has a plurality of planar surfaces including a first planar surface, a second planar surface, and the clamping surface, wherein the clamping surface extends between the first planar surface and the second planar surface, wherein the first planar surface and the second planar surface are parallel.

The at least two slots of the clamping of the bracket plate and the at least two slots of the clamp are semicircular, and the two holes formed by the slots are circular.

The bolt hole extends through the bracket plate between the at least two slots of the bracket plate and through the clamp between the at least two slots of the clamp.

The left mounting bracket and the right mounting bracket are configured to be rotationally fixed in all directions with respect to the turfgrass mower when the left mounting bracket and the right mounting bracket are attached to the turfgrass mower.

Yet another aspect of this document relates to a brush attachment system for a turfgrass mower that includes a crossbeam with a brush mount suspended from the crossbeam and configured to support a brush. At least one mounting bracket is attached to the crossbeam and has: a bracket plate having a clamping surface; a clamp configured to butt against the clamping surface of the bracket plate; and at least two slots extending into the bracket plate and at least two slots extending into the clamp, wherein when the clamp butts against the clamping surface, the at least two slots of the bracket plate align with the at least two slots of the clamp to form two holes through the at least one mounting bracket. The at least one mounting bracket is configured to attach to a turfgrass mower having two crossbars by attaching the clamp to the bracket plate with the two crossbars of the turfgrass mower passing through the two holes.

Particular implementations may comprise one or more of the following features.

The brush attachment system may further include a bolt hole extending through the bracket plate and through the clamp, the bolt hole configured to receive a bolt, wherein when the bolt extends through the bolt hole and a nut is tightened onto the bolt, the clamp is pressed against the clamping surface of the bracket plate.

The bolt hole extends through the bracket plate between the at least two slots of the bracket plate and through the clamp between the at least two slots of the clamp.

The brush attachment system may further include an adjustment plate attached to the crossbeam, wherein the at least one mounting bracket is attached to the crossbeam through the adjustment plate.

The adjustment plate has a plurality of height adjustment holes extending therethrough, the plurality of height adjustment holes configured to enable adjustment of a position of the at least one mounting bracket on the adjustment plate.

The brush attachment system may further include a plurality of bolts configured to pass through the bracket plate of the at least one mounting bracket to attach the at least one mounting bracket to the adjustment plate.

The bracket plate has a plurality of planar surfaces including a first planar surface, a second planar surface, and the clamping surface, wherein the clamping surface extends between the first planar surface and the second planar surface, and wherein the first planar surface and the second planar surface are parallel.

The at least two slots of the clamping of the bracket plate and the at least two slots of the clamp are semicircular, and the two holes formed by the slots are circular.

The at least one mounting bracket is configured to be rotationally fixed in all directions with respect to the turfgrass mower when the at least one mounting bracket is attached to the turfgrass mower.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
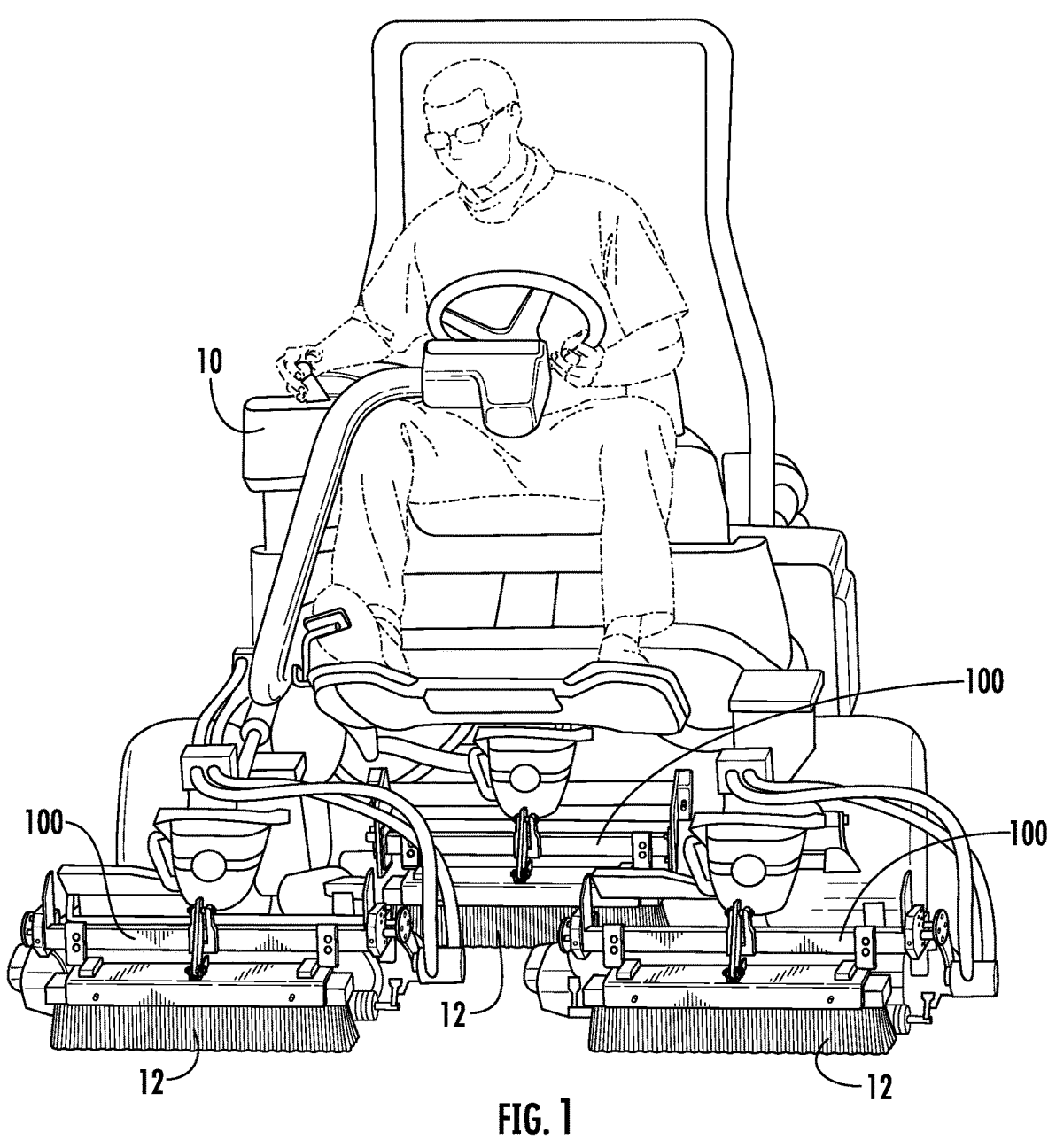
FIG. 1 is a perspective view of a turfgrass mower with a brush installed on the front using a brush attachment system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described in the drawings and detailed description of the technology below.

Unless specifically noted, it is intended that the words and phrases in the specification and the claims be given their plain, ordinary, and accustomed meaning to those of ordinary skill in the applicable arts. The inventor is fully aware that they can be their own lexicographers if desired. The inventor expressly elects, as their own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred implementations, but in addition, include any and all structures, materials or acts that perform the claimed function as described in alternative implementations or forms of the disclosure, or that are well known present or later-developed, equivalent structures, material or acts for performing the claimed function.

In the following description, and for the purposes of explanation, numerous specific details are set forth in order to provide a thorough understanding of the various aspects of the disclosure. It will be understood, however, by those skilled in the relevant arts, that implementations of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

The term "plurality", as used herein, means more than one. When a range of values is expressed, another implementation includes from the one particular value and/or to the other particular value. Similarly, when values are expressed as approximations, by use of the antecedent "about," it will be understood that the particular value forms another implementation. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed implementations of the present disclosure are included herein. It is to be understood that the disclosed implementations are merely exemplary of the invention that may be implemented in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular implementations by way of example only and is not intended to be limiting of the claimed inventions.

Figure 2:
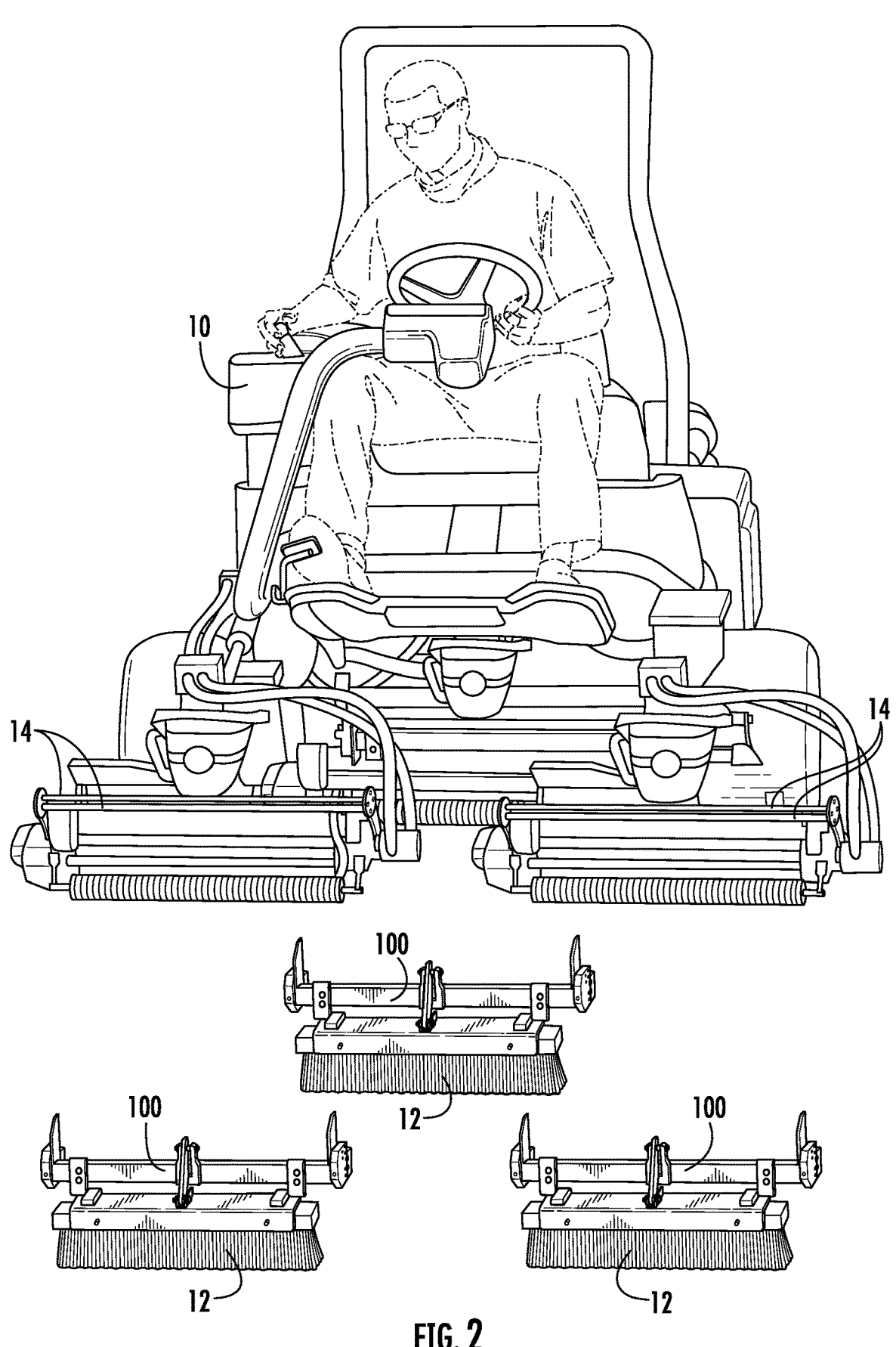
FIG. 2 is an exploded view of the turfgrass mower shown in FIG. 1.

The present disclosure is related to a brush attachment system 100 for a turfgrass mower 10. As shown in FIGS. 1-2, the brush attachment system 100 disclosed herein is configured to attach to a turfgrass mower 10 and support a brush 12 in front of the turfgrass mower 10 in a way that allows the brush 12 to brush the grass just before the turfgrass mower 10 cuts the grass.

Figure 3:
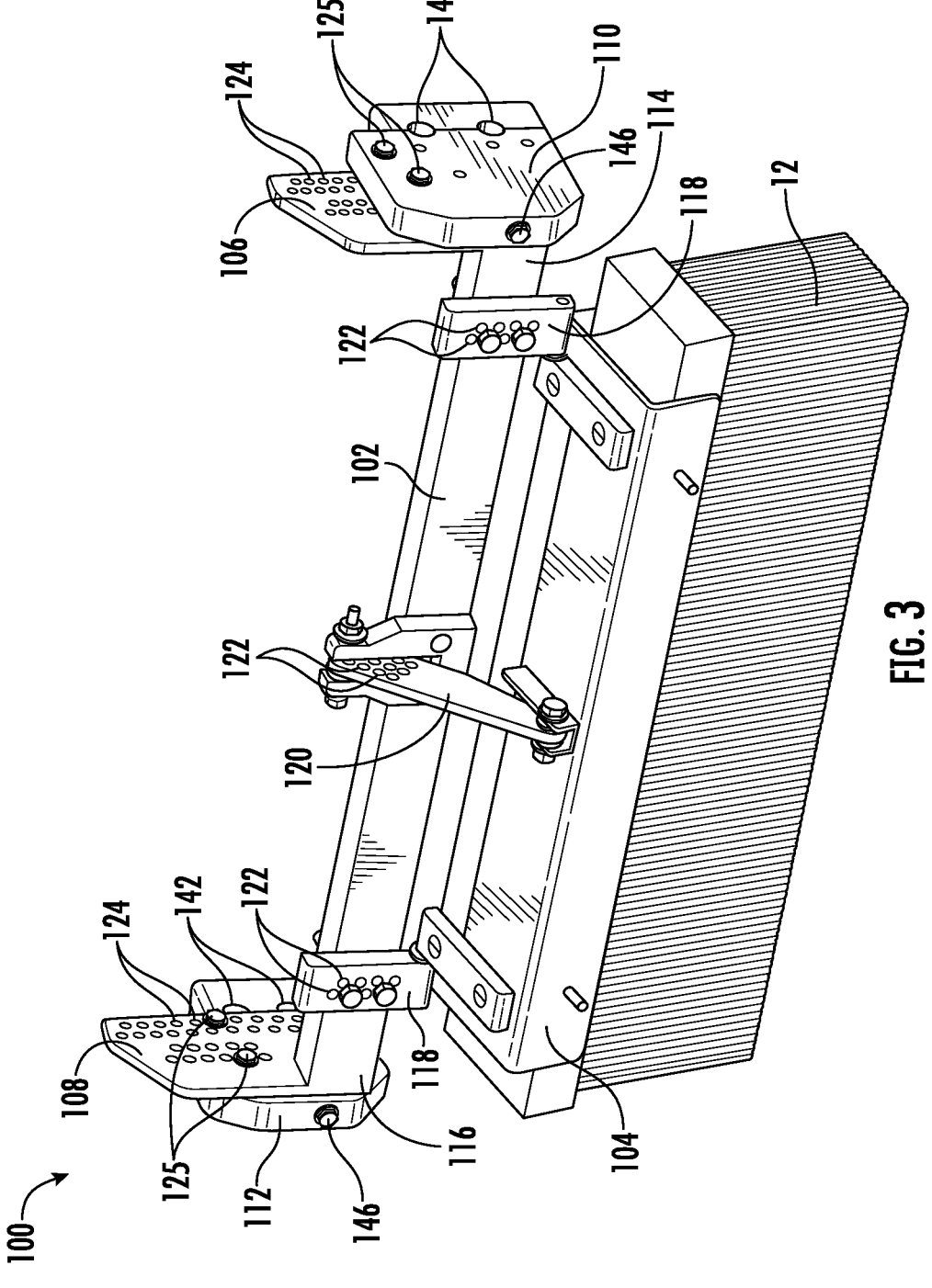
FIG. 3 is a perspective view of the brush attachment system shown in FIG. 1.
Figure 4:
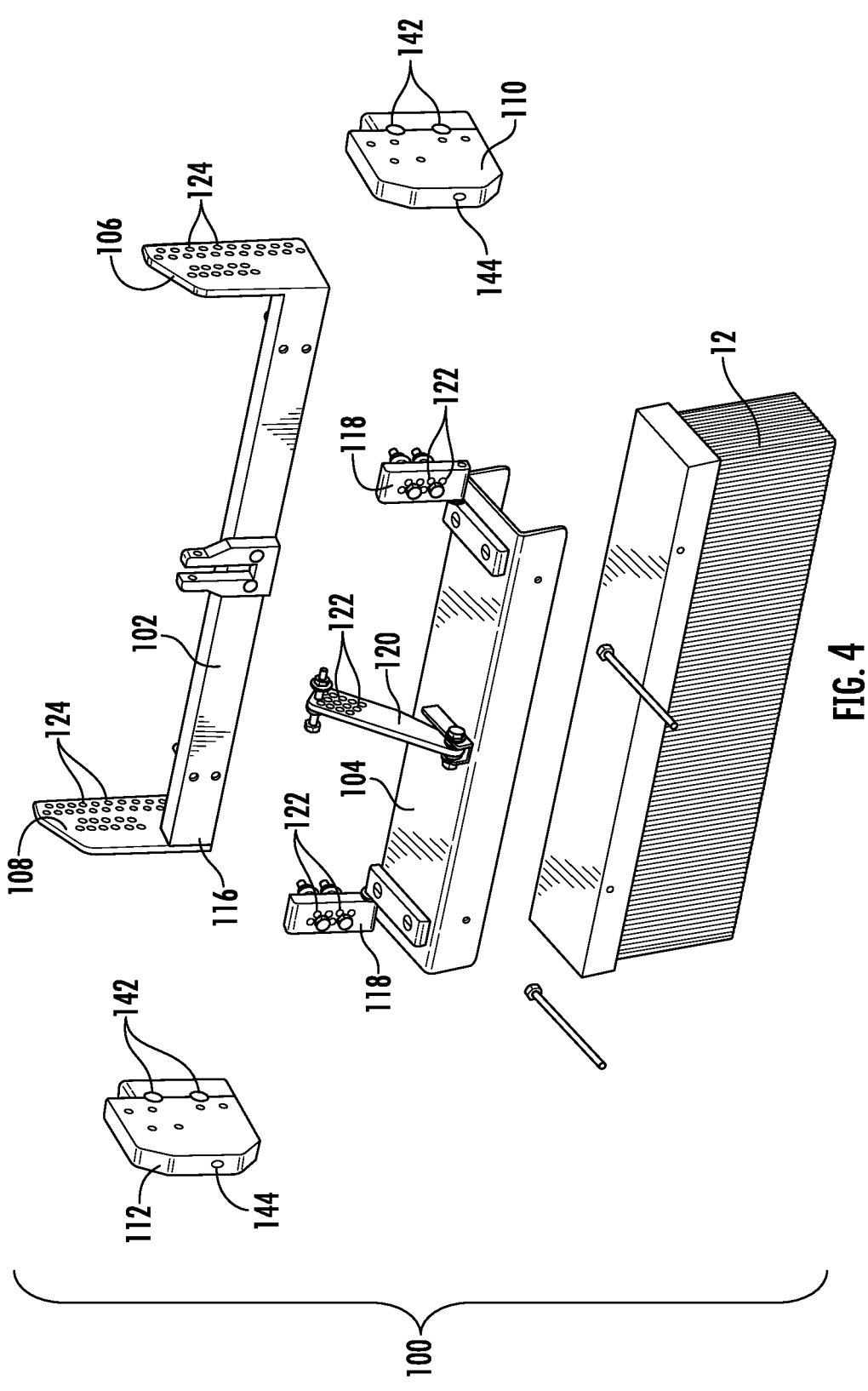
FIG. 4 is an exploded view of the brush attachment system shown in FIG. 3.
Figure 5:
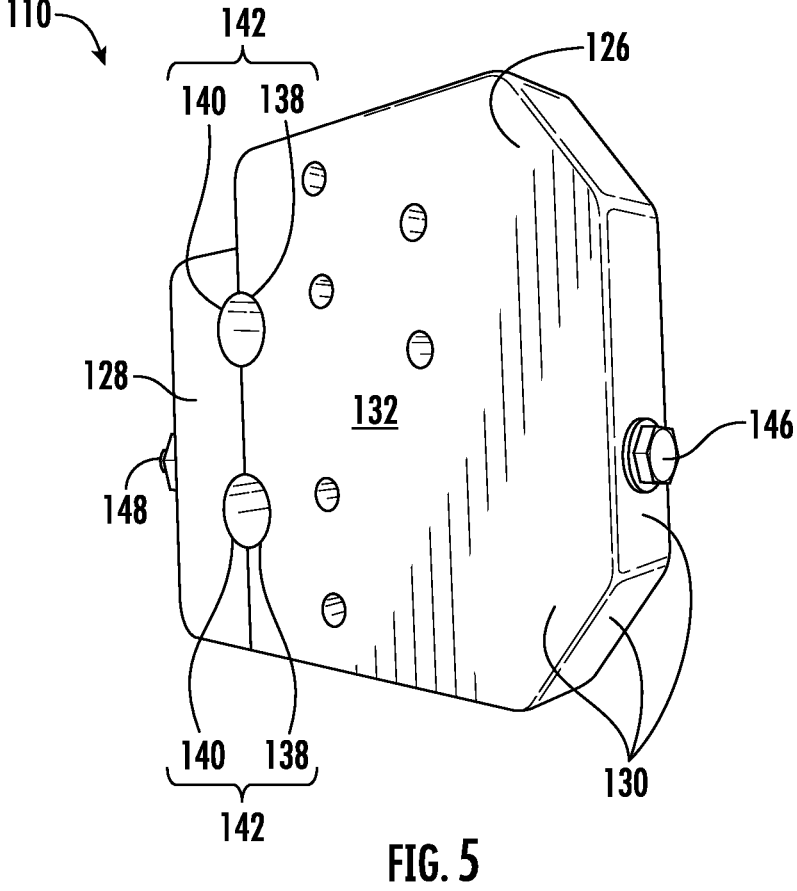
FIG. 5 is a perspective view of the mounting bracket of the brush attachment system shown in FIG. 1.
Figure 6:
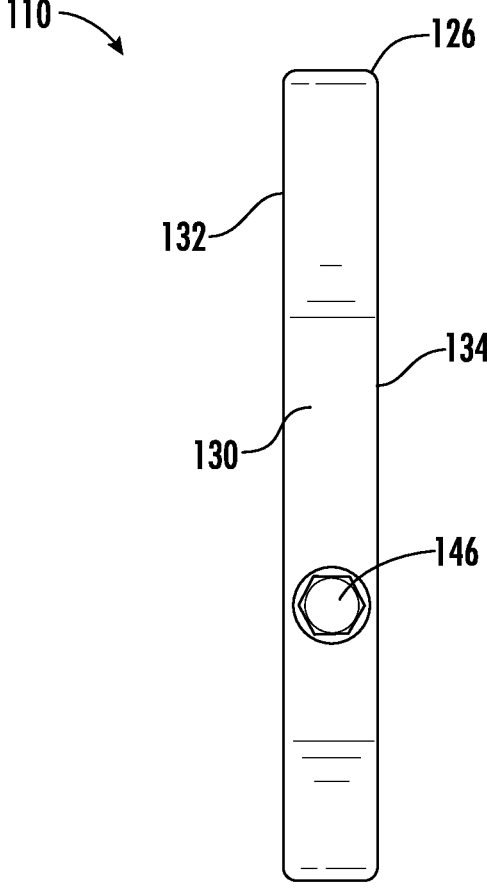
FIG. 6 is a front view of the mounting bracket shown in FIG. 5.
Figure 7:
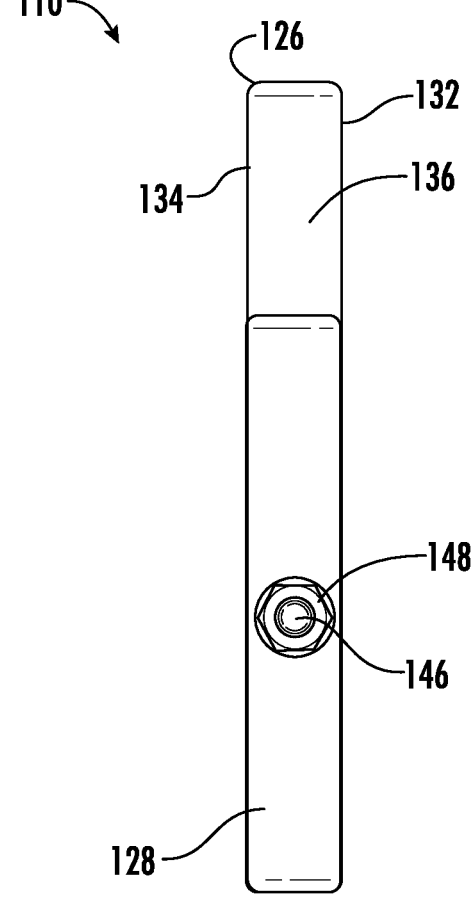
FIG. 7 is a back view of the mounting bracket shown in FIG. 5.
Figure 8:
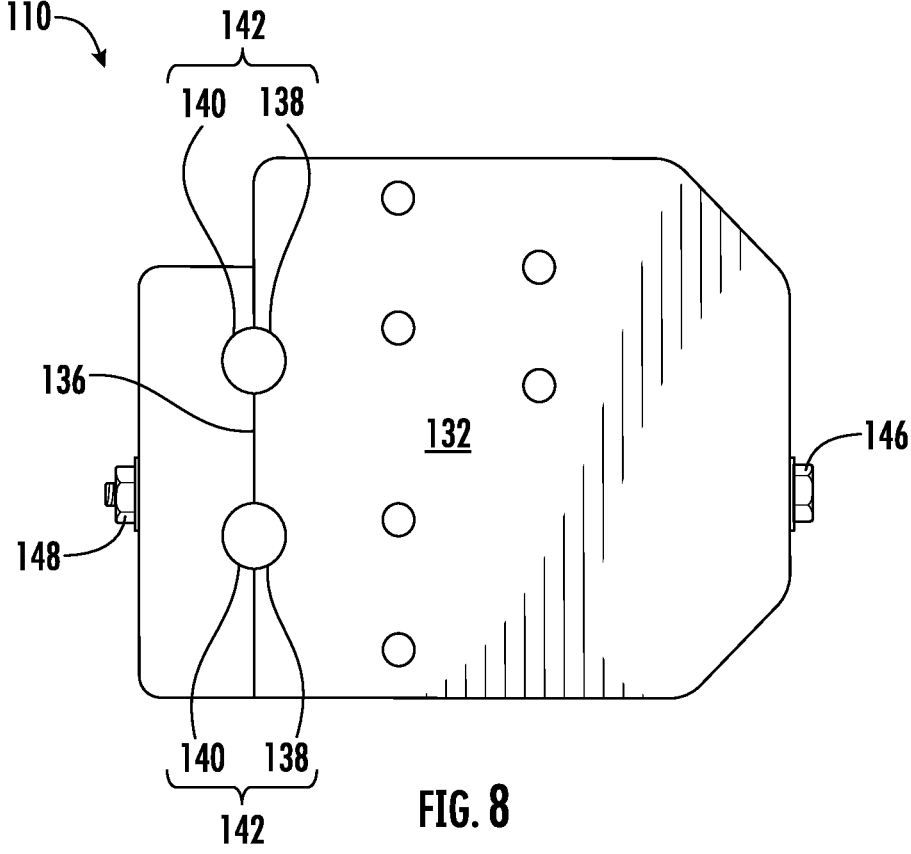
FIG. 8 is a left view of the mounting bracket shown in FIG. 5.
Figure 9:
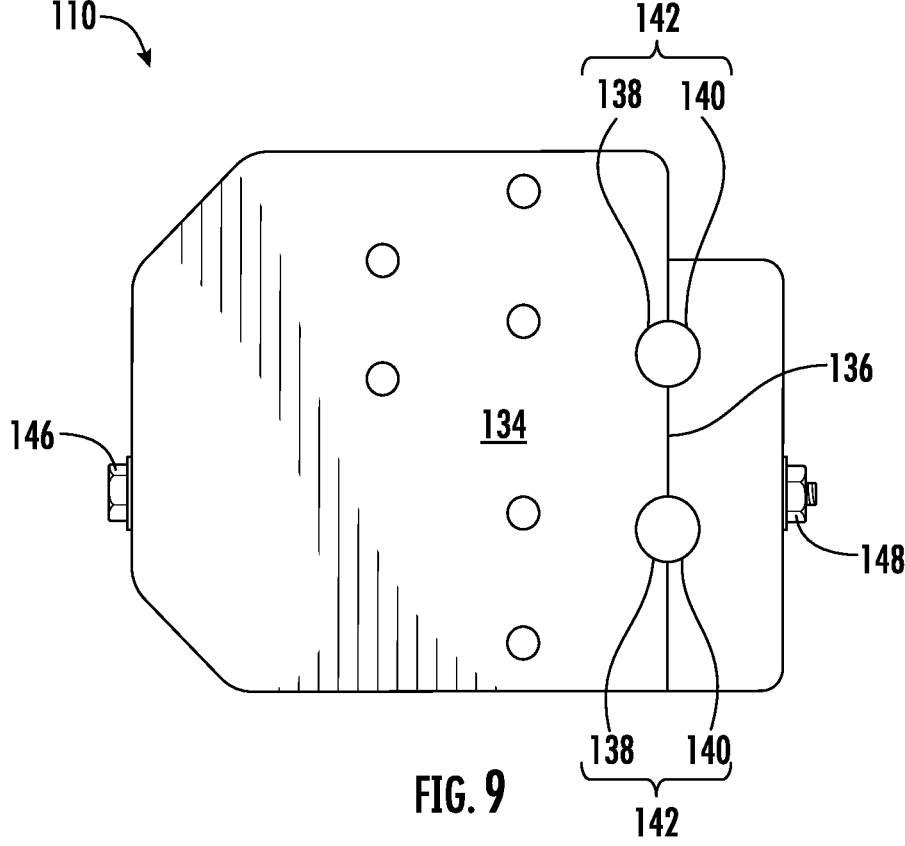
FIG. 9 is a right view of the mounting bracket shown in FIG. 5.
Figure 10:
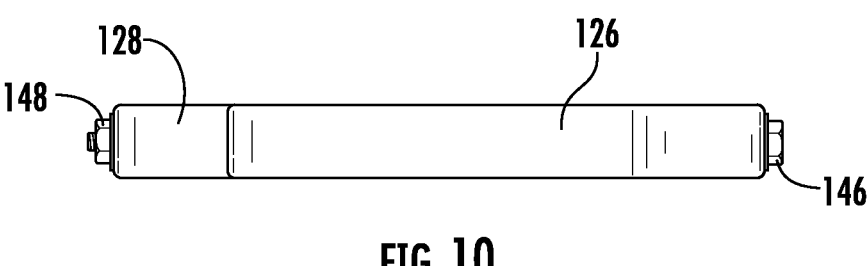
FIG. 10 is a top view of the mounting bracket shown in FIG. 5.
Figure 11:
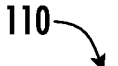
FIG. 11 is a bottom view of the mounting bracket shown in FIG. 5.
Figure 11:
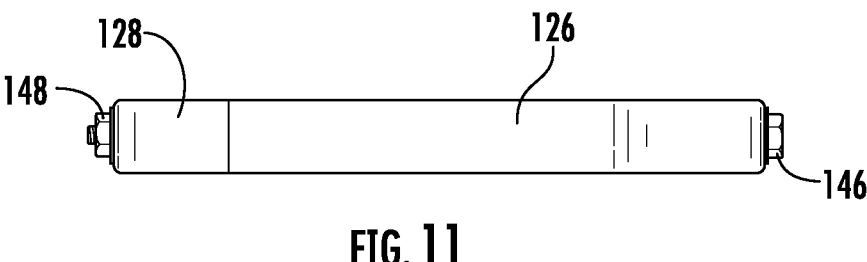

As shown in FIGS. 3-4, the brush attachment system 100 may comprise a crossbeam 102, a brush mount 104, a left adjustment plate 106 and a right adjustment plate 108, and a left mounting bracket 110 and a right mounting bracket 112. The crossbeam 102 has a left end 114 and a right end 116 distal to the left end 114. The crossbeam 102 extends between the left end 114 and the right end 116 and may be elongated. The crossbeam 102 may have any cross-sectional shape, including a rectangular shape, a circular shape, or any other shape. Additionally, the crossbeam 102 may be a solid elongated body, or may be hollow. The brush mount 104 is suspended from the crossbeam 102 and is configured to support the brush 12. The position of the brush mount 104 with respect to the crossbeam 102 may be adjustable. The brush mount 104 may be coupled to the crossbeam 102 through at least one height adjuster 118 to enable this position adjustment. In addition, the angle of the brush mount 104 with respect to the cross beam 102 may be adjustable. The brush mount 104 may be rotatably coupled to the height adjuster 118, and an angle adjuster 120 may extend between the brush mount 104 and the crossbeam 102 and rotatably couple to both the brush mount 104 and the crossbeam 102. As will be clear to one of skill in the art, the combination of the rotation of the brush mount 104 with respect to the height adjuster 118 and the rotation of the angle adjuster 120 with respect to the brush mount 104 and the crossbeam 102 allows the brush mount 104 to be moved to and then fixed at any angle desired. The angle adjuster 120 and the height adjuster 118 may each have a plurality of holes 122 to allow the brush mount 104 to be fixed in the desired position and at the desired angle.

The brush attachment system 100 may be symmetrical, and thus the left adjustment plate 106 may be a mirror image of the right adjustment plate 108 and the left mounting bracket 110 may be a mirror image of the right mounting bracket 112. The left adjustment plate 106 and the right adjustment plate 108 may be attached to the left end 114 and the right end 116, respectively, of the crossbeam 102. The left adjustment plate 106 and the right adjustment plate 108 may be manufactured separately from the crossbeam 102 and later joined or attached to the crossbeam 102 or may be integrally formed with the crossbeam 102. In implementations where the left adjustment plate 106 and the right adjustment plate 108 are manufactured separately, the left adjustment plate 106 and the right adjustment plate 108 may be attached to the crossbeam 102 through any fastening means, including bolting with bolts, screws, or rivets, welding, or adhesive bonding. Other methods of joining the left adjustment plate 106 and the right adjustment plate 108 to the crossbeam 102 may also be used. The left adjustment plate 106 and the right adjustment plate 108 may each have a plurality of height adjustment holes 124 extending therethrough. The height adjustment holes 124 may be spaced at regular intervals along the adjustment plates 106, 108, and are configured to receive a bolt therethrough.

The left mounting bracket 110 and the right mounting bracket 112 may be attached, respectively, to the left adjustment plate 106 and the right adjustment plate 108. The height adjustment holes 124 of the adjustment plates 106, 108 may enable adjustment of the position of the mounting brackets 110, 112 on the adjustment plates 106, 108 by allowing the mounting brackets 110, 112, to bolt or otherwise couple to the adjustment plates 106, 108 in various positions on the adjustment plates 106, 108. Thus, the brush attachment system 100 may also comprise a plurality of bolts 125 configured to pass through the bracket plates 126 of the left mounting bracket 110 and the right mounting bracket 112 to attach the left mounting bracket 110 and the right mounting bracket 112 to the left adjustment plate 106 and the right adjustment plate 108, respectively.

As shown in FIGS. 5-11, each of the left mounting bracket 110 and the right mounting bracket 112 may have a bracket plate 126 and a clamp 128. The bracket plate 126 may have a plurality of surfaces 130, including a first surface 132 and a second surface 134. In some implementations, the surfaces 130 are planar, in other implementations, a portion of the surfaces 130 may be planar and another portion may be non-planar, and in some additional implementations, the surfaces 130 may all be non-planar. The surfaces 130 also include a clamping surface 136, which may extend between the first surface 132 and the second surface 134. The first surface 132 and the second surface 134 may be parallel to each other. The clamp 128 is configured to butt against the clamping surface 136 of the bracket plate 126.

The bracket plate 126 may have at least two slots 138 extending into the bracket plate 126 and the clamp 128 may have at least two slots 140 extending into the clamp 128. The slots 138, 140 may be semicircular in shape. When the clamp 128 butts against the clamping surface 136 of the bracket plate 126, the slots 138 of the bracket plate 126 may align with the slots 140 of the clamp 128 to form at least two holes 142. The holes 142 may be circular, or any other shape. The holes 142 can thus be used to attach the brush attachment system 100 to the turfgrass mower 10. For example, the turfgrass mower 10 may have two crossbars 14 extending in front of the turfgrass mower 10. The left mounting bracket 110 and the right mounting bracket 112 may each be configured to attach to the turfgrass mower 10 by attaching the clamp 128 of each mounting bracket 110, 112 to the bracket plate 126 of each mounting bracket 110, 112 with the two crossbars 14 of the turfgrass mower 10 passing through the two holes 142. The brush attachment system 100 is thus secured to the turfgrass mower 10.

Each of the mounting brackets 110, 112 may also have a bolt hole 144 extending through the bracket plate 126 and through the clamp 128. When the clamp 128 is butted against the clamping surface 136 of the bracket plate 126, the bolt hole 144 of the bracket plate 126 is aligned with the bolt hole 144 of the clamp 128 to form a continuous bolt hole 144 through the mounting bracket 110, 112. The bolt hole 144 may extend through the bracket plate 126 between the at least two slots 138 of the bracket plate 126 and through the clamp 128 between the at least two slots 140 of the clamp

128. This helps to balance the forces acting on the mounting brackets 110, 112. The bolt hole 144 is configured to receive a bolt 146. When the bolt 146 extends through the bolt hole 144 and a nut 148 is tightened onto the bolt 146 or the bolt 146 is otherwise tightened into the bolt hole 144, such as by having the bolt hole 144 within the clamp 128 be threaded, the clamp 128 is pressed against the clamping surface 136 of the bracket plate 126. In this way, if the crossbars 14 pass through the two holes 142, the clamp 128 can be secured against the clamping surface 136 to secure the brush attachment system 100 on the turfgrass mower 10.

When the mounting brackets 110, 112 are secured or attached to the turfgrass mower 10, the mounting brackets 110, 112 may be configured to be rotationally fixed in all directions with respect to the turfgrass mower 10. This helps to hold the brush 12 in a fixed position with respect to the turfgrass mower 10 and improves the results of brushing the turfgrass.

It will be understood that implementations of a brush attachment system are not limited to the specific assemblies, devices and components disclosed in this document, as virtually any assemblies, devices and components consistent with the intended operation of a brush attachment system may be used. Accordingly, for example, although particular brush attachment systems, and other assemblies, devices and components are disclosed, such may include any shape, size, style, type, model, version, class, measurement, concentration, material, weight, quantity, and/or the like consistent with the intended operation of brush attachment systems. Implementations are not limited to uses of any specific assemblies, devices and components; provided that the assemblies, devices and components selected are consistent with the intended operation of a brush attachment system.

Accordingly, the components defining any brush attachment system may be formed of any of many different types of materials or combinations thereof that can readily be formed into shaped objects provided that the materials selected are consistent with the intended operation of a brush attachment system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various brush attachment systems may be manufactured using conventional procedures as added to and improved upon through the procedures described here. Some components defining a brush attachment system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling brush attachment systems are not limited to the specific order of steps as disclosed in this document. Any steps or sequence of steps of the assembly of a brush attachment system indicated herein are given as examples of possible steps or sequence of steps and not as limitations, since various assembly processes and sequences of steps may be used to assemble brush attachment systems.

The implementations of a brush attachment system described are by way of example or explanation and not by way of limitation. Rather, any description relating to the foregoing is for the exemplary purposes of this disclosure, and implementations may also be used with similar results for a variety of other applications employing a brush attachment system.

What is claimed is:

1. A brush attachment system for a turfgrass mower comprising:

a crossbeam extending between a left end and a right end distal to the left end;

a brush mount suspended from the crossbeam and configured to support a brush;

a left adjustment plate and a right adjustment plate attached to the left end and the right end of the crossbeam, respectively, each of the left adjustment plate and the right adjustment plate having a plurality of height adjustment holes extending therethrough; and a left mounting bracket and a right mounting bracket attached to the left adjustment plate and the right adjustment plate, respectively, wherein the height adjustment holes of the left adjustment plate and the right adjustment plate enable adjustment of a position of the left mounting bracket and the right mounting bracket on the left adjustment plate and the right adjustment plate, respectively, each of the left mounting bracket and the right mounting bracket having:

a bracket plate having a plurality of planar surfaces including a first planar surface, a second planar surface, and a clamping surface extending between the first planar surface and the second planar surface;

a clamp configured to butt against the clamping surface of the bracket plate;

at least two semicircular slots extending into the bracket plate and at least two semicircular slots extending into the clamp, wherein when the clamp butts against the clamping surface, the at least two semicircular slots of the bracket plate align with the at least two semicircular slots of the clamp to form two circular holes; and a bolt hole extending through the bracket plate between the at least two semicircular slots of the bracket plate and through the clamp between the at least two semicircular slots of the clamp, the bolt hole configured to receive a bolt, wherein when the bolt extends through the bolt hole and a nut is tightened onto the bolt, the clamp is pressed against the clamping surface of the bracket plate;

wherein each of the left mounting bracket and the right mounting bracket is configured to attach to a turfgrass mower having two crossbars by attaching the clamp to the bracket plate with the two crossbars of the turfgrass mower passing through the two circular holes.

2. The brush attachment system of claim 1, wherein the left mounting bracket and the right mounting bracket are configured to be rotationally fixed in all directions with respect to the turfgrass mower when the left mounting bracket and the right mounting bracket are attached to the turfgrass mower.

3. The brush attachment system of claim 1, further comprising a plurality of bolts configured to pass through the bracket plates of the left mounting bracket and the right mounting bracket to attach the left mounting bracket and the right mounting bracket to the left adjustment plate and the right adjustment plate, respectively.

4. The brush attachment system of claim 1, wherein the first planar surface and the second planar surface are parallel.

5. A brush attachment system for a turfgrass mower comprising:

a crossbeam extending between a left end and a right end distal to the left end;

a brush mount suspended from the crossbeam and configured to support a brush; and a left mounting bracket and a right mounting bracket attached to the left end of the crossbeam and the right end of the crossbeam, respectively, each of the left mounting bracket and the right mounting bracket having:

a bracket plate having a clamping surface;

a clamp configured to butt against the clamping surface of the bracket plate;

at least two slots extending into the bracket plate and at least two slots extending into the clamp, wherein when the clamp butts against the clamping surface, the at least two slots of the bracket plate align with the at least two slots of the clamp to form two holes; and a bolt hole extending through the bracket plate and through the clamp, the bolt hole configured to receive a bolt, wherein when the bolt extends through the bolt hole and a nut is tightened onto the bolt, the clamp is pressed against the clamping surface of the bracket plate;

wherein each of the left mounting bracket and the right mounting bracket is configured to attach to a turfgrass mower having two crossbars by attaching the clamp to the bracket plate with the two crossbars of the turfgrass mower passing through the two holes.

6. The brush attachment system of claim 5, further comprising a left adjustment plate and a right adjustment plate attached to the left end and the right end of the crossbeam, respectively, wherein the left mounting bracket is attached to the left end of the crossbeam through the left adjustment plate and the right mounting bracket is attached to the right end of the crossbeam through the right adjustment plate.

7. The brush attachment system of claim 6, wherein each of the left adjustment plate and the right adjustment plate has a plurality of height adjustment holes extending therethrough, the plurality of height adjustment holes configured to enable adjustment of a position of the left mounting bracket and the right mounting bracket on the left adjustment plate and the right adjustment plate, respectively.

8. The brush attachment system of claim 5, wherein each bracket plate has a plurality of planar surfaces including a first planar surface, a second planar surface, and the clamping surface, wherein the clamping surface extends between the first planar surface and the second planar surface, wherein the first planar surface and the second planar surface are parallel.

9. The brush attachment system of claim 5, wherein the at least two slots of the clamping of the bracket plate and the at least two slots of the clamp are semicircular, and the two holes formed by the slots are circular.

10. The brush attachment system of claim 5, wherein the bolt hole extends through the bracket plate between the at least two slots of the bracket plate and through the clamp between the at least two slots of the clamp.

11. The brush attachment system of claim 5, wherein the left mounting bracket and the right mounting bracket are configured to be rotationally fixed in all directions with respect to the turfgrass mower when the left mounting bracket and the right mounting bracket are attached to the turfgrass mower.

12. A brush attachment system for a turfgrass mower comprising:

a crossbeam with a brush mount suspended from the crossbeam and configured to support a brush; and at least one mounting bracket attached to the crossbeam, each of the at least one mounting bracket having:

a bracket plate having a clamping surface;

a clamp configured to butt against the clamping surface of the bracket plate;

at least two slots extending into the bracket plate and at least two slots extending into the clamp, wherein when the clamp butts against the clamping surface, the at least two slots of the bracket plate align with the at least two slots of the clamp to form two holes through the at least one mounting bracket; and a bolt hole extending through the bracket plate and through the clamp, the bolt hole configured to receive a bolt, wherein when the bolt extends through the bolt hole and a nut is tightened onto the bolt, the clamp is pressed against the clamping surface of the bracket plate;

wherein each of the at least one mounting bracket is configured to attach to a turfgrass mower having two crossbars by attaching the clamp to the bracket plate with the two crossbars of the turfgrass mower passing through the two holes.

13. The brush attachment system of claim 12, wherein the bolt hole extends through the bracket plate between the at least two slots of the bracket plate and through the clamp between the at least two slots of the clamp.

14. The brush attachment system of claim 12, further comprising an adjustment plate attached to the crossbeam, wherein the at least one mounting bracket is attached to the crossbeam through the adjustment plate.

15. The brush attachment system of claim 14, wherein the adjustment plate has a plurality of height adjustment holes extending therethrough, the plurality of height adjustment holes configured to enable adjustment of a position of the at least one mounting bracket on the adjustment plate.

16. The brush attachment system of claim 14, further comprising a plurality of bolts configured to pass through the bracket plate of the at least one mounting bracket to attach the at least one mounting bracket to the adjustment plate.

17. The brush attachment system of claim 12, wherein the bracket plate has a plurality of planar surfaces including a first planar surface, a second planar surface, and the clamping surface, wherein the clamping surface extends between the first planar surface and the second planar surface, and wherein the first planar surface and the second planar surface are parallel.

18. The brush attachment system of claim 12, wherein the at least two slots of the clamping of the bracket plate and the at least two slots of the clamp are semicircular, and the two holes formed by the slots are circular.

19. The brush attachment system of claim 12, wherein the at least one mounting bracket is configured to be rotationally fixed in all directions with respect to the turfgrass mower when the at least one mounting bracket is attached to the turfgrass mower.

* * * * *